United States Patent
Soyyuece et al.

(10) Patent No.: US 12,128,710 B2
(45) Date of Patent: Oct. 29, 2024

(54) PNEUMATIC VEHICLE TIRE

(71) Applicant: Continental Reifen Deutschland GmbH, Hannover (DE)

(72) Inventors: Atakan Soyyuece, Langenhagen (DE); Ahmet Özüduru, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 217 days.

(21) Appl. No.: 17/755,217

(22) PCT Filed: Oct. 12, 2020

(86) PCT No.: PCT/EP2020/078554
§ 371 (c)(1),
(2) Date: Apr. 22, 2022

(87) PCT Pub. No.: WO2021/094043
PCT Pub. Date: May 20, 2021

(65) Prior Publication Data
US 2022/0379665 A1 Dec. 1, 2022

(30) Foreign Application Priority Data
Nov. 12, 2019 (DE) .................... 10 2019 217 439.6

(51) Int. Cl.
*B60C 11/03* (2006.01)
*B60C 11/13* (2006.01)

(52) U.S. Cl.
CPC ...... *B60C 11/0302* (2013.01); *B60C 11/0309* (2013.01); *B60C 11/1369* (2013.01);
(Continued)

(58) Field of Classification Search
CPC ............. B60C 11/1369; B60C 11/1353; B60C 11/125; B60C 2011/1361; B60C 2011/1338; B60C 11/13; B60C 11/0309
See application file for complete search history.

(56) References Cited

U.S. PATENT DOCUMENTS

2003/0019555 A1 * 1/2003 Nakagawa .......... B60C 11/0302
152/DIG. 3
2013/0192733 A1 8/2013 Flament et al.
(Continued)

FOREIGN PATENT DOCUMENTS

| CN | 102686416 A | 9/2012 | |
| EP | 1974957 A1 * | 10/2008 | ............. B60C 11/11 |

(Continued)

OTHER PUBLICATIONS

Chinese Office Action dated Mar. 24, 2023 corresponding to Chinese Patent Application No. 202080078770.1.
(Continued)

*Primary Examiner* — Cedrick S Williams
*Assistant Examiner* — Thomas Frank Schneider
(74) *Attorney, Agent, or Firm* — Richard A. Wolf; Gregory Adams

(57) ABSTRACT

A pneumatic vehicle tire having a tread with at least one profile block row which is divided into a multiplicity of profile blocks by transverse channels having channel flanks which extend at an angle of up to 50° with respect to the axial direction, wherein transverse channels are provided, in each of which there is formed a base elevation which locally reduces the depth of the transverse channel and which connects successive profile blocks in a circumferential direction to one another, wherein the base elevation has at least two base elevation parts of different height. Centrally on each of the base elevation parts there is formed at least one groove which runs in the direction of extent of the transverse channel and which emerges from the base elevation part at least on one side.

8 Claims, 4 Drawing Sheets

(52) U.S. Cl.
CPC .......... *B60C 2011/0365* (2013.01); *B60C 2011/0369* (2013.01); *B60C 2011/0372* (2013.01)

(56) References Cited

U.S. PATENT DOCUMENTS

| | | |
|---|---|---|
| 2018/0345734 A1 | 12/2018 | Mori |
| 2020/0130418 A1* | 4/2020 | Miyamoto .......... B60C 11/0008 |
| 2020/0171888 A1* | 6/2020 | Meguro .............. B60C 11/0309 |

FOREIGN PATENT DOCUMENTS

| | | | | |
|---|---|---|---|---|
| EP | 3124290 A1 | * | 2/2017 | ......... B60C 11/0306 |
| JP | S63154407 A | * | 6/1988 | |
| JP | 2004161202 A | * | 6/2004 | |
| JP | 2013144486 A | | 7/2013 | |

OTHER PUBLICATIONS

International Search Report dated Nov. 23, 2020 of International Application PCT/EP2020/078554 on which this application is based.

* cited by examiner

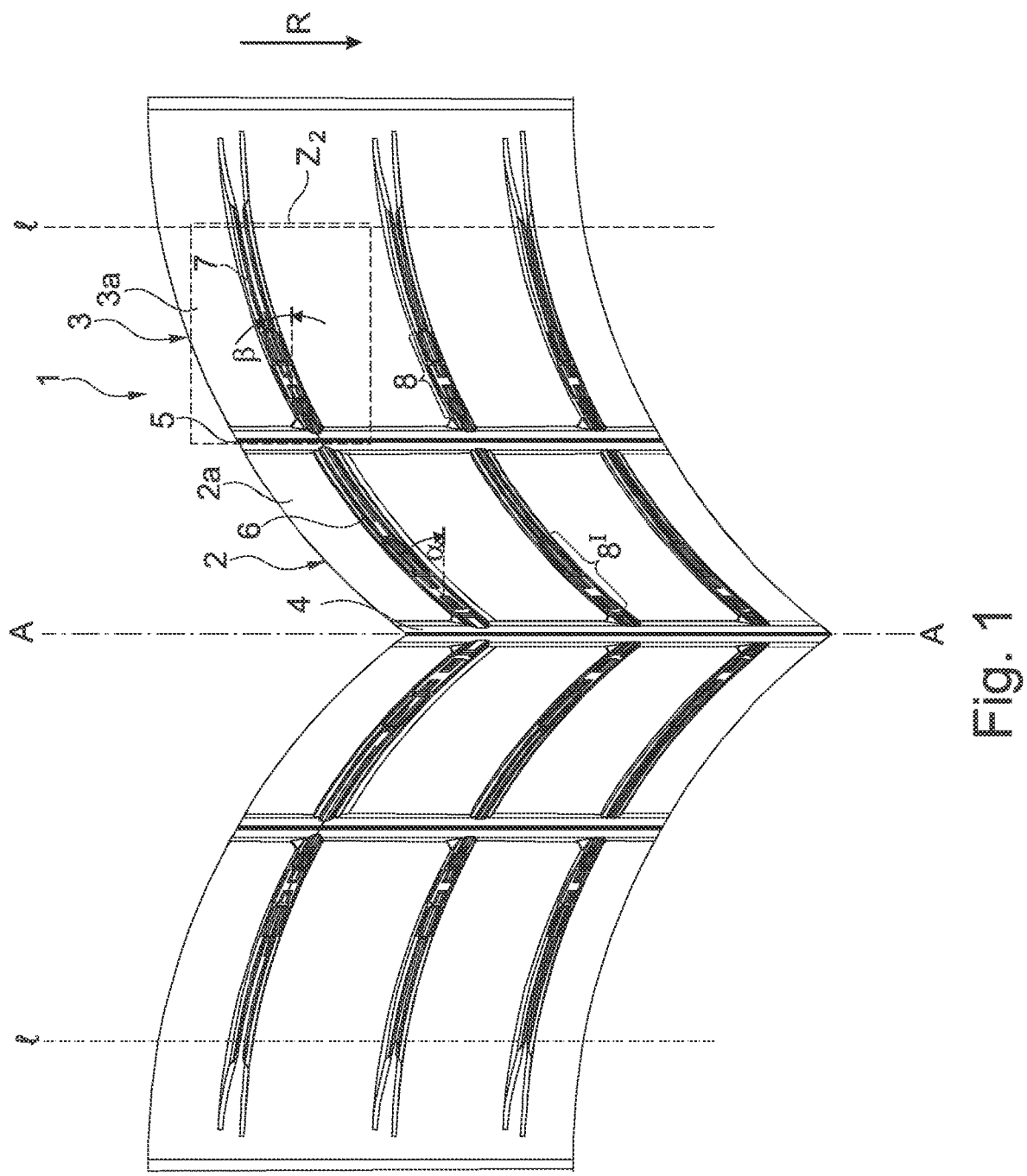

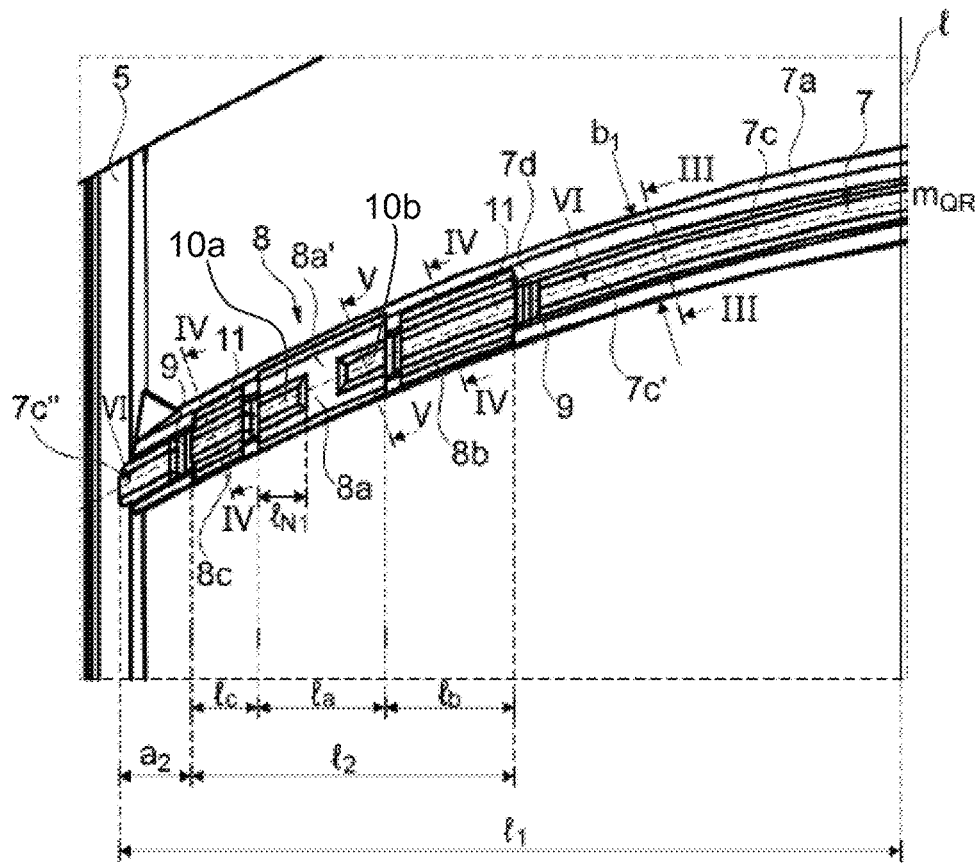
Fig. 2: Detail $Z_2$
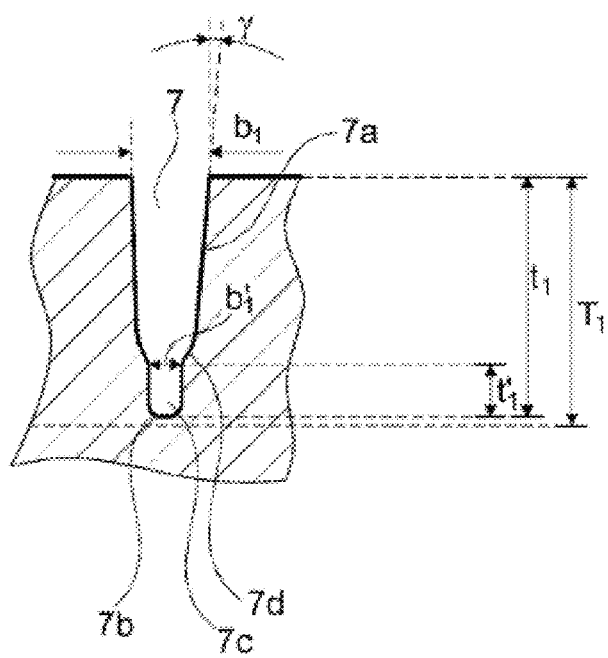
Fig. 3: Section III-III

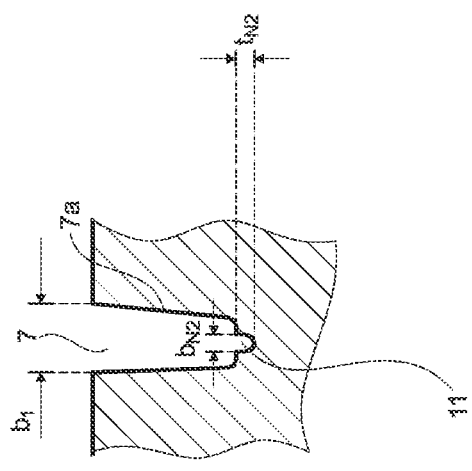
Fig. 4: Section IV-IV
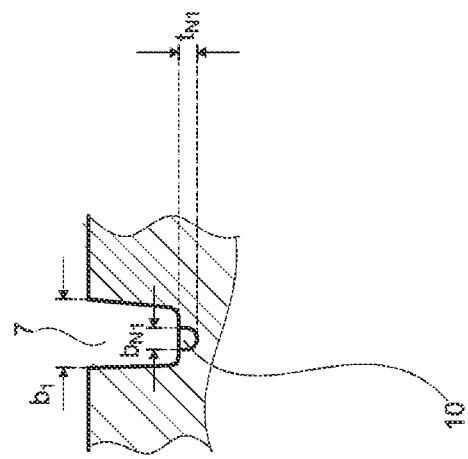
Fig. 5: Section V-V

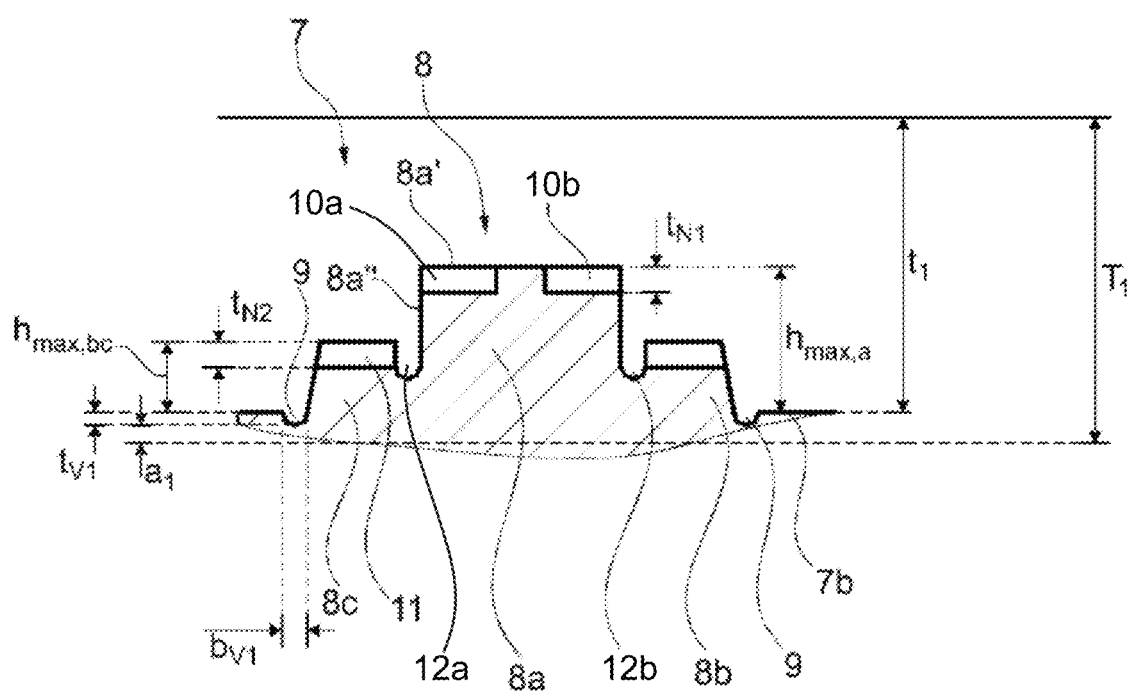
Fig. 6: Section VI-VI

PNEUMATIC VEHICLE TIRE

The invention relates to a pneumatic vehicle tire having a tread with at least one profile block row which is divided into a multiplicity of profile blocks by transverse channels having channel flanks which extend at an angle of up to 50° with respect to the axial direction, wherein transverse channels are provided, in each of which there is formed a base elevation which locally reduces the depth of the transverse channel and which connects successive profile blocks in a circumferential direction to one another, wherein the base elevation has at least two base elevation parts of different height.

Such a pneumatic vehicle tire is known for example from EP 1 974 957 A1. The tread of the tire has at least one profile block row with transverse channels, in each of which a base elevation is formed. The base elevation is composed of at least two base elevation parts of different heights, wherein, in particular, up to ten base elevation parts of different heights are provided. During travel on soft underlying surfaces, the different heights of the base elevation parts are intended to allow grip behavior that is adapted to the amount of mud, snow or slush on the surface.

The invention is based on the object, in the case of a pneumatic vehicle tire of the type mentioned in the introduction, of improving the driving characteristics on snowy roads, in particular the so-called snow-on-snow friction, wherein it is sought to ensure good grip characteristics under traction in the circumferential and transverse directions.

The stated object is achieved according to the invention in that, centrally on each of the base elevation parts, there is formed at least one groove which runs in the direction of extent of the transverse channel and which emerges from the base elevation part at least on one side.

When driving on snow or slush, snow is pressed and compacted into the grooves on the base elevation parts, as a result of which particularly good traction characteristics in the circumferential and transverse directions can be achieved owing to a pronounced effect of snow-on-snow friction. Owing to the at least two base elevation parts of different heights, this effect can be maintained effectively over the service life of the tire or with progressive tread wear.

According to one preferred embodiment, in at least one of the base elevation parts, the groove extends all the way through the base elevation part. A greater amount of snow can accumulate in a groove that extends all the way through than in a groove that does not extend all the way through, which has a particularly advantageous effect on the effect of snow-on-snow friction.

In this embodiment, it is preferred if, at least in the base elevation part(s) with the smaller height, the groove extends all the way through the base elevation part. This measure is particularly advantageous for good snow-on-snow friction with progressive tread wear.

According to a further preferred embodiment, the base elevation part with the greater height is provided with two grooves which emerge on different sides and which run in particular in alignment with one another. Snow is compacted particularly effectively in blind grooves of this type, which act as "snow pockets".

In this embodiment, it is furthermore preferred if the grooves which emerge on different sides of the base elevation part have a length, projected into the axial direction, of 20% to 40%, in particular of at least 30%, of the length, projected into the axial direction, of the base elevation part.

According to a further preferred embodiment, the grooves have, in a radial direction, a depth of 0.5 mm to 3.0 mm, in particular of up to 2.0 mm, and a width of 35% to 50%, in particular of at least 40%, of the width of the associated transverse channel. This measure also supports good traction characteristics in the circumferential and transverse directions owing to the effect of snow-on-snow friction.

The effects described are particularly effectively maintained with increasing wear of the tread if the heights of the base elevation parts are adapted to one another in a specific way. In this regard, it is advantageous if the height of the base elevation part with the greater height is 40% to 100%, in particular 45% to 85%, and particularly preferably at least 50%, of the depth of the associated transverse channel, and if the height of the base elevation part with the smaller height is 20% to 30%, in particular 23% to 27%, of the depth of the associated transverse channel.

According to a further preferred embodiment, the base elevation part with the smaller height is provided with a depression which adjoins the base elevation part with the greater height and which extends to the channel flanks and which has a width of 0.7 mm to 3.0 mm, in particular of 1.0 mm to 2.0 mm, and a depth of 0.3 mm to 2.0 mm, in particular of 0.5 mm to 1.0 mm. These grooves act as additional snow pockets and provide additional grip edges.

In a further preferred embodiment, on at least one side, in particular on each side, of the base elevation, a depression with a width of 0.7 mm to 3.0 mm, in particular of 1.0 mm to 2.0 mm, and a depth of 0.3 mm to 2.0 mm, in particular of 0.5 mm to 1.0 mm, is formed on the channel base of the transverse channel. This, too, is a measure for improving snow grip.

In a particularly preferred embodiment, base elevations are provided which are each composed of two or three base elevation parts of different heights, wherein, in the case of three base elevation parts, the middle base elevation part is the tallest.

In this embodiment, it is advantageous if the base elevations with exactly two base elevation parts are formed in a transverse channel of a middle profile block row, and if the base elevations with exactly three base elevation parts are formed in a transverse channel of a shoulder-side profile block row.

The base elevation parts are preferably each delimited in a radial direction by a top surface which, in the regions that are free from grooves, runs parallel to the tread periphery. This measure promotes the accumulation of snow in the grooves of the base elevation parts.

The base elevation preferably has a length, projected into the axial direction, of 30% to 50%, in particular of 25% to 40%, of the length, projected into the axial direction, of the transverse channel.

In further preferred embodiments, on the channel base of the transverse channel, there is formed a channel base channel which is narrower than the transverse channel and which has a depth of 15% to 25% of the depth of the transverse channel and a width of 40% to 60% of the width of the transverse channel, such that further grip edges are available.

Further features, advantages and details of the invention will now be described in more detail with reference to the drawing, which schematically shows an exemplary embodiment of the invention. In the drawing:

FIG. 1 shows a plan view of a partial development of a tread of a pneumatic vehicle tire with a design variant according to the invention, FIG. 2 shows an enlarged plan view of the detail $Z_2$ in FIG. 1, FIG. 3 shows a section along the line III-III in FIG. 2, FIG. 4 shows a section along the line IV-IV in FIG. 2, FIG. 5 shows a section along the line V-V in FIG. 2, and FIG. 6 shows a section along the line VI-VI in FIG. 2.

Pneumatic vehicle tires designed according to the invention are, in particular, tires of radial type of construction for passenger motor vehicles, vans or light trucks, wherein the tires are provided for driving under wintry driving conditions.

FIG. 1 shows a circumferential portion of a tread 1 of a pneumatic vehicle tire. In the exemplary embodiment shown, the tread 1 has a profiling of directional design, wherein the pneumatic vehicle tire must be installed on the vehicle so as to have the rolling direction symbolized by the arrow R during forward travel. The equatorial plane of the tire is indicated by a dashed line A-A, and the lateral edges of the ground-contacting part of the tread (corresponds to the statically determined footprint according to E.T.R.T.O. standards: load at 70% of the maximum load-bearing capacity at an internal pressure of 85% according to the E.T.R.T.O. standard) are indicated by dashed lines 1.

In each tread half, the tread 1 has a middle profile block row 2 and a shoulder-side profile block row 3. The middle profile block rows 2 are separated from one another by a central circumferential channel 4 which is straight in plan view and which runs along the equatorial plane, and from the respectively adjacent shoulder-side profile block row 3 by a shoulder-side circumferential channel 5, which in the exemplary embodiment shown runs in a straight manner in plan view. The circumferential channels 4, 5 are formed to the respectively provided profile depth $T_1$ (indicated in FIG. 6), which is typically 6.5 mm to 10.0 mm for the preferred tire type.

Each central profile block row 2 is provided with middle transverse channels 6 running parallel to one another, and each shoulder-side profile block row 3 is provided with shoulder-side transverse channels 7 running parallel to one another, wherein the transverse channels 6, 7 extend in a V-shape across the tread width. The middle transverse channels 6 divide the middle rows of profile blocks 2 into middle profile blocks 2a and run in slightly curved form and at an angle $\alpha$ of 30° to 55°, in particular of at least 45°, with respect to the axial direction. The shoulder-side transverse channels 7 divide the shoulder-side profile block rows 3 into shoulder-side profile blocks 3a and likewise run in slightly curved form and at an angle $\beta$ of 5° to 20° with respect to the axial direction. The angles $\alpha$ and $\beta$ of the transverse channels 6, 7 each relate to a centerline $m_{QR}$ which follows the channel profile and which is therefore curved (shown in FIG. 2 for one transverse channel 7) and are measured relative to a local tangent to the centerline $m_{QR}$.

A base elevation 8 is formed within the ground contact patch in each shoulder-side transverse channel 7, and a base elevation $8^I$ is formed in each middle transverse channel 6, wherein the base elevations 8, $8^I$ connect the respective profile blocks 2a, 3a to one another and thus locally reduce the depth of the transverse channel 6, 7. The further configuration of a shoulder-side transverse channel 7 and of a base elevation 8 will be discussed in more detail below with reference to FIG. 2 and the associated sections in FIG. 3 to FIG. 6. The differences between the base elevation $8^I$ and the base elevation 8 will then be discussed.

According to FIG. 2 and FIG. 3, the shoulder-side transverse channel 7 has two channel flanks 7a and, in the region outside the base elevation 8, a channel base 7b with a U-shaped cross section (FIG. 3). The transverse channel 7 has, at the tread periphery, a width $b_1$ of 5.0 mm to 8.0 mm measured perpendicularly to its centerline $m_{QR}$, has, in the region of the channel base 7b, a maximum depth $t_1$ (FIG. 3, FIG. 6) measured in a radial direction, and has, measured within the ground contact patch and based on the centerline $m_{QR}$, a length $l_1$ projected into the axial direction. The maximum depth $t_1$ of the transverse channel 7 is 0.5 mm to 2.0 mm less than the profile depth $T_1$ (FIG. 3, FIG. 6).

According to FIG. 3, as viewed in cross section of the transverse channel 7, the channel flanks 7a run at an angle $\gamma$ of 0° to 7°, in particular of 1.5° to 6°, with respect to the radial direction, wherein the angles $\gamma$ of the two channel flanks 7a correspond or differ from one another, and wherein the channel flanks 7a may have chamfers, rounded portions or the like, in particular of known design, running to the tread periphery, wherein these are not taken into consideration in the measurement of the width $b_1$ of the transverse channel 7. At the channel base 7b, there is formed a channel base channel 7c which is designed to be narrower than the transverse channel 7 and which is U-shaped as viewed in the cross section of the transverse channel 7, wherein oblique or rounded transition flanks 7d which slope downward to the channel base channel 7c run between the channel flanks 7a and the channel base 7b. The channel base channel 7c has, in the radial direction, a depth $t_1'$ of 15% to 25% of the depth $t_1$ and, at the radially outer end of its U-limbs, a width $b_1'$ of 40% to 60% of the width $b_1$ of the transverse channel 7, and, owing to the base elevation 8, is divided into a channel base channel section 7c' at the inside of the tread and a channel base channel section 7c" at the outside of the tread (FIG. 2).

According to FIG. 2, the base elevation 8 is composed of a base elevation part 8a (second base elevation part), a lateral base elevation part 8b (first base elevation part) at the outside of the tread, and a lateral base elevation part 8c (third base elevation part) at the inside of the tread. At each side of the base elevation 8, there is situated a depression 9 which adjoins the respective lateral base elevation part 8b, 8c and which is formed on the channel base 7b and at which the channel base channel section 7c' at the inside of the tread or the channel base channel section 7c" at the tread outside ends. As shown in FIG. 6, the depressions 9, as viewed in longitudinal section of the transverse channel 7, are U-shaped and have a width $b_{V1}$ of 0.7 mm to 3.0 mm, in particular of 1.0 mm to 2.0 mm, a depth $t_{V1}$ of 0.3 mm to 2.0 mm, in particular of 0.5 mm to 1.0 mm, and preferably a radial spacing $a_1$ of 1.0 mm to 2.0 mm to the level of the profile depth $T_1$.

As is also shown in FIG. 2, the base elevation 8 has, measured at its base and based on the centerline $m_{QR}$, a length $l_2$, projected into the axial direction, of 30% to 50%, in particular of 35% to 45%, of the length $l_1$, projected into the axial direction, of the transverse channel 7. The base elevation part 8a has a length $l_a$, the lateral base elevation part 8b has a length $l_b$ and the lateral base elevation part 8c has a length $l_c$, wherein the lengths $l_a$, $l_b$, $l_c$ are measured analogously to the length $l_1$ of the transverse channel 7. The length $l_a$ of the base elevation part 8a and the length $l_b$ of the lateral base elevation part 8b is in each case 33% to 45% of the length $l_1$ of the transverse channel 7, and, in the exemplary embodiment shown, the length $l_c$ of the lateral base elevation part 8c is smaller than the length $l_a$, $l_b$. The base elevation 8 has, based on the centerline $m_{QR}$, a spacing $a_2$, projected into the axial direction, of 2.0 to 3.0 mm to the respective shoulder-side circumferential channel 5.

According to FIG. 6, the base elevation part 8a is cuboidal and, in relation to the level of the channel base 7b (=depth $t_1$), has a maximum height $h_{max,\ a}$, measured in a radial direction, of 40% to 100%, in particular of 45% to 85%, and particularly preferably of at least 50%, of the depth $t_1$. The base elevation part 8a is delimited in a radial direction by a top surface 8a' and also by two side surfaces 8a" running in a radial direction. Two grooves 10a and 10b (collectively referred to as grooves 10) are formed on the top surface 8a', which grooves proceed from the different side surfaces 8a", are in alignment with one another, are spaced apart correspondingly from the channel flanks 7a, and are separated by a web (FIG. 2). The grooves 10 give rise to an H shape of the top surface 8a' as seen in plan view and in the direction of extent of the transverse channel 7 (FIG. 2), wherein the top surface 8a' is oriented parallel to the tread periphery in the regions that are free from grooves 10. As shown in FIG. 5, as viewed in cross section of the transverse channel 7, the grooves 10 are U-shaped and have a width $b_{N1}$ of 35% to 50%, in particular at least 40%, of the width $b_1$ of the transverse channels 7, a depth $t_{N1}$, measured in the radial direction, of 0.5 mm to 3.0 mm, in particular up to 2.0 mm, and a length $l_{N1}$ (FIG. 2), projected into the axial direction, of 20% to 40%, in particular of at least 30%, of the length $l_a$ (FIG. 2) of the base elevation part 8a.

According to FIG. 6, the lateral base elevation parts 8b, 8c have a maximum height $h_{max,\ bc}$ relative to the level of the channel base 7b of 20% to 30%, in particular of 23% to 27%, of the depth $t_1$. As shown in FIG. 2, centrally on each of the base elevation parts 8b, 8c, there is formed a groove 11 (FIG. 5) which has a U-shaped cross section and which is correspondingly spaced apart from the channel flanks 7a and which extends all the way through the respective base elevation part 8b, 8c in the direction of extent of the transverse channel 7 and which has a width $b_{N2}$ (FIG. 4) of 35% to 50% of the width $b_1$ of the transverse channel 7 and a depth $t_{N2}$ (FIG. 4) in a radial direction of 0.5 mm to 3.0 mm, in particular of up to 2.0 mm. As shown in FIG. 6, the lateral base elevation parts 8b, 8c in the exemplary embodiment shown are provided with respective depressions 12a, 12b (collectively referred to herein as depressions 12) adjoining the middle base elevation part 8a. The cross section, width and depth of the depressions 12 correspond to those of the depressions 9 (also referred to as third and fourth depressions 9). The depressions 12 extend between the channel flanks 7a and therefore between the shoulder-side profile blocks 3a.

As such, according to aspect(s), the present disclosure provides a pneumatic vehicle tire including a tread with at least one profile block row (2, 3) which is divided into a multiplicity of profile blocks (2a, 3a) by transverse channels (6, 7) having channel flanks (7a) which extend at an angle (α, β) of up to 50° with respect to an axial direction, wherein the transverse channels (6, 7) are provided, in each of which there is formed a base elevation (8, 81) which locally reduces a depth (t1) of the transverse channels (6, 7) and which connects successive profile blocks (2a, 3a) in a circumferential direction to one another, wherein the base elevation (8, 81) includes first, second, and third base elevation parts (8a, 8b, 8c) arranged adjacently to each other in the direction of extent of the transverse channel, such that the second base elevation part (8a) is in between the first and third base elevation parts (8c, 8b), wherein an upper surface (8a') of the second base elevation part (8a) is at a greater height than an upper surface of the first base elevation part (8c), and wherein the upper surface (8a') of the second base elevation part (8a) is at a greater height than an upper surface of the third base elevation part (8b), wherein the upper surface of the first base elevation part is separated from the second base elevation part by a first depression (12), and the upper surface of the third base elevation part is separated from the second base elevation part by a second depression (12), wherein the first base elevation part (8c) includes a groove (11) that is formed centrally in its upper surface and which extends in the direction of extent of the transverse channel across the entirety of the upper surface of the first base elevation part to emerge from both sides of the first base elevation part, wherein the third base elevation part (8b) includes a groove (11) that is formed centrally in its upper surface and which extends in the direction of extent of the transverse channel across the entirety of the upper surface of the third base elevation part to emerge from both sides of the third base elevation part, and wherein the second base elevation part (8a) includes a first groove (10) that is formed centrally in its upper surface (8a') and which extends in the direction of extent of the transverse channel across only a first portion of the upper surface of the second base elevation part to emerge from only a first side (8a") of the second base elevation part, wherein the second base elevation part further includes a second groove (10) that is separated from the first groove by the upper surface (8a'), the second groove (10) being formed centrally in the upper surface of the second base elevation part and which extends in the direction of extent of the transverse channel across only a second portion of the upper surface of the second base elevation part to emerge from only a second side of the second base elevation part that is opposite the first side (8a").

The base elevation 81 already mentioned, which is shown in FIG. 1 and which is provided in each case in a middle transverse channel 6, is a variant of the base elevation 8. Said base elevation 81 differs from this in particular in that it is composed of only two base elevation parts, one of which is designed analogously to the middle base elevation part 8a and the other of which is designed analogously to the lateral base elevation part 8b. In the exemplary embodiment shown, each base elevation $8^I$ has a smaller spacing to the central circumferential channel 4 than to the respective shoulder-side circumferential channel 5.

Furthermore, in the exemplary embodiment shown, at some corner regions of the profile blocks 2a, 3a, there are formed sloping corner chamfers (not designated in FIG. 1 and FIG. 2) which are designed in particular in a known manner and are not part of the invention.

The invention is not limited to the exemplary embodiments described.

For example, the base elevation part 8a may have only one of the grooves 10. The depressions 9, 12, and the channel base channel 7c running in the region outside the base elevation 8, $8^I$, are optional. The tire has at least one profile block row with transverse channels comprising base elevations.

LIST OF REFERENCE SIGNS

1 . . . Tread
2 . . . Middle profile block row
2a . . . Middle profile block
3 . . . Shoulder-side profile block row
3a . . . Shoulder-side profile block
4 . . . Central circumferential channel
5 . . . Shoulder-side circumferential channel
6 . . . . Middle transverse channel
7 . . . Shoulder-side transverse channel
7a . . . Channel flank
7b . . . Channel base 7c . . . Channel base channel
7c', 7c" . . . Channel base channel section
7d . . . Transition flank
8, $8^I$ . . . Base elevation
8a . . . Base elevation part
8a' . . . Top surface
8a" . . . Side surface
8b . . . Lateral base elevation part
8c . . . Lateral base elevation part
9 . . . . Depression
10a, 10b . . . Groove
11 . . . Groove
12a, 12b . . . Depression
A-A . . . Line (equatorial plane)
$a_1$, $a_2$ . . . Spacing
$b_1$, $b_1'$, $b_{V1}$, $b_{N1}$, $b_{N2}$ Width
$h_{max,\,a}$, $h_{max,\,bc}$. Maximum height
$l_1$, $l_2$, $l_a$, $l_b$, $l_c$, $l_{N1}$ Length
l . . . Line (lateral edge of the ground contact patch)
$m_{QR}$ . . . Centerline
R . . . . Arrow (rolling direction)
$T_1$ . . . Profile depth
$t_1$ . . . Maximum depth
$t_1'$, $t_{V1}$, $t_{N1}$, $t_{N2}$ Depth
α, β, γ . . . Angles

The invention claimed is:

1. A pneumatic vehicle tire comprising a tread with at least one profile block row which is divided into a multiplicity of profile blocks by transverse channels having channel flanks which extend at an angle of up to 50° with respect to an axial direction, wherein the transverse channels are provided, in each of which there is formed a base elevation which locally reduces a depth (t1) of the transverse channels and which connects successive profile blocks in a circumferential direction to one another,
   wherein the base elevation includes first, second, and third base elevation parts arranged adjacently to each other in the direction of extent of the transverse channel, such that the second base elevation part is in between the first and third base elevation parts,
   wherein an upper surface of the second base elevation part is at a greater height than an upper surface of the first base elevation part, and wherein the upper surface of the second base elevation part is at a greater height than an upper surface of the third base elevation part,
   wherein the upper surface of the first base elevation part is separated from the second base elevation part by a first depression, and the upper surface of the third base elevation part is separated from the second base elevation part by a second depression,
   wherein the first base elevation part includes a groove that is formed centrally in its upper surface and which extends in the direction of extent of the transverse channel across the entirety of the upper surface of the first base elevation part to emerge from both sides of the first base elevation part,
   wherein the third base elevation part includes a groove that is formed centrally in its upper surface and which extends in the direction of extent of the transverse channel across the entirety of the upper surface of the third base elevation part to emerge from both sides of the third base elevation part, and
   wherein the second base elevation part includes a first groove that is formed centrally in its upper surface and which extends in the direction of extent of the transverse channel across only a first portion of the upper surface of the second base elevation part to emerge from only a first side of the second base elevation part, wherein the second base elevation part further includes a second groove that is separated from the first groove by the upper surface, the second groove being formed centrally in the upper surface of the second base elevation part and which extends in the direction of extent of the transverse channel across only a second portion of the upper surface of the second base elevation part to emerge from only a second side of the second base elevation part that is opposite the first side.

2. The pneumatic vehicle tire as claimed in claim 1, wherein the respective grooves of the first, second and third base elevation parts have, in a radial direction, a depth ($t_{N1}$, $t_{N2}$) of 0.5 mm to 3.0 mm, and a width ($b_{N1}$, $b_{N2}$) of 35% to 50%, of a width ($b_1$) of an associated transverse channel of the transverse channels.

3. The pneumatic vehicle tire as claimed in claim 1, wherein the two first and second grooves of the second base elevation part each have a length (lN1), projected into the axial direction, of 20% to 40%, of a length ($l_a$), projected into the axial direction, of the second base elevation part.

4. The pneumatic vehicle tire as claimed in claim 1, wherein the second base elevation part has a height (hmax, a) of from 40% to 100% of a depth (t1) of an associated transverse channel of the transverse channels and wherein the first and third base elevation parts each have a height (hmax, bc) from 20% to 30% of the depth (t1) of the associated transverse channel.

5. The pneumatic vehicle tire as claimed in claim 1, wherein each of the first and second depressions has a width of 0.7 mm to 3.0 mm and a depth of 0.3 mm to 2.0 mm.

6. The pneumatic vehicle tire as claimed in claim 5, wherein the width of each of the first and second depressions is from 1.0 mm to 2.0 mm, and the depth of each of the first and second depressions is from 0.5 mm to 1.0 mm.

7. The pneumatic vehicle tire as claimed in claim 1, wherein on a side of the first base elevation part opposite the first depression is formed a third depression, and on a side of the third base elevation part opposite the second depression is formed a fourth depression, each of the third and fourth depressions having a width (bV1) of 0.7 mm to 3.0 mm, and a depth ($t_{V1}$) of 0.3 mm to 2.0 mm.

8. The pneumatic vehicle tire as claimed in claim 7, wherein the width (bV1) of each of the third and fourth depressions is from 1.0 mm to 2.0 mm, and the depth ($t_{V1}$) of each of the third and fourth depressions is from 0.5 mm to 1.0 mm.

* * * * *